(12) United States Patent
Motomiya et al.

(10) Patent No.: US 10,766,418 B2
(45) Date of Patent: Sep. 8, 2020

(54) ELECTRIC RETRACTABLE VIEW DEVICE FOR VEHICLE

(71) Applicant: MURAKAMI CORPORATION, Shizuoka (JP)

(72) Inventors: Masahiro Motomiya, Fujieda (JP); Kenji Ichikawa, Shizuoka (JP); Takayuki Miyazaki, Fujieda (JP); Mizuki Toyama, Kakegawa (JP)

(73) Assignee: MURAKAMI CORPORATION, Shizuoka (JP)

( * ) Notice: Subject to any disclaimer, the term of this patent is extended or adjusted under 35 U.S.C. 154(b) by 177 days.

(21) Appl. No.: 15/560,808

(22) PCT Filed: Mar. 18, 2016

(86) PCT No.: PCT/JP2016/058732
§ 371 (c)(1),
(2) Date: Sep. 22, 2017

(87) PCT Pub. No.: WO2016/158502
PCT Pub. Date: Oct. 6, 2016

(65) Prior Publication Data
US 2018/0111557 A1 Apr. 26, 2018

(30) Foreign Application Priority Data

Mar. 31, 2015 (JP) .................................. 2015-071247

(51) Int. Cl.
*B60R 1/074* (2006.01)
*B60R 16/03* (2006.01)

(52) U.S. Cl.
CPC .............. *B60R 1/074* (2013.01); *B60R 16/03* (2013.01); *B60Y 2410/115* (2013.01)

(58) Field of Classification Search
CPC ........... B60R 1/074; B60R 16/03; B60R 1/06; B60R 1/07; B60R 1/02; B60Y 2410/115
(Continued)

(56) References Cited

U.S. PATENT DOCUMENTS 5,477,390 A 12/1995 Boddy et al.
7,652,403 B2 * 1/2010 Sakata .................. B60R 1/0612
310/71

(Continued)

FOREIGN PATENT DOCUMENTS

CN 1129428 A 8/1996
CN 1903625 A 1/2007
(Continued)

OTHER PUBLICATIONS

International Search Report for International Application No. PCT/JP2016/058732 dated May 24, 2016, along with an English-language translation thereof.

(Continued)

*Primary Examiner* — Stephone B Allen
*Assistant Examiner* — Rahman Abdur
(74) *Attorney, Agent, or Firm* — Greenblum & Bernstein, P.L.C.

(57) ABSTRACT

This invention intends to enhance space efficiency in an electric retractable view device for a vehicle. A motor drives a view device rotating section to rotate in a direction around an axis of a shaft. A circuit board supplies electric drive power to the motor. The circuit board is disposed vertically between the shaft and the motor. The circuit board includes motor connection terminals and a connector connection terminal. The motor connection terminals are connected to motor terminals of the motor. A connector of an external electric power supply wiring is connected to the connector connection terminal. In a state in which the motor connec- (Continued)

tion terminals are connected to the motor terminals, the connector connection terminal is disposed below the motor connection terminals between the circuit board and the motor.

12 Claims, 9 Drawing Sheets

(58) Field of Classification Search
USPC .......................................................... 359/841
See application file for complete search history.

(56) References Cited

U.S. PATENT DOCUMENTS

| | | | | |
|---|---|---|---|---|
| 8,569,917 B2* | 10/2013 | Tang | ...................... | H02K 5/148 310/68 B |
| 8,764,205 B2* | 7/2014 | Sakata | .................... | B60R 1/076 359/841 |
| 2008/0247070 A1 | 10/2008 | Sakata | | |

FOREIGN PATENT DOCUMENTS

| | | |
|---|---|---|
| EP | 2457772 | 5/2012 |
| JP | 11-59274 | 3/1999 |
| JP | 11-059275 | 3/1999 |
| JP | 2008-087652 | 4/2008 |
| JP | 2012-111444 | 6/2012 |
| JP | 2013-189168 | 9/2013 |
| JP | 2013-241107 | 12/2013 |
| JP | 2014-024387 | 2/2014 |

OTHER PUBLICATIONS

Written Opinion for International Application No. PCT/JP2016/058732 dated May 24, 2016, along with an English-language translation thereof.
Office Action issued in China Counterpart Patent Appl. No. 201660020280.X, dated Jan. 30, 2019.
Japanese Office Action for JP App. No. 2015-071247 dated Jul. 10, 2018, along with English-language translation thereof.

* cited by examiner

ELECTRIC RETRACTABLE VIEW DEVICE FOR VEHICLE

The disclosure of Japanese Patent Application No. JP2015-071247 filed on Mar. 31, 2015 including the specification, drawings, claims and abstract is incorporated herein by reference in its entirety.

TECHNICAL FIELD

This invention relates to an electric retractable view device for a vehicle such as an electric retractable mirror for a vehicle or an electric retractable camera for a vehicle, and intends to enhance space efficiency in the electric retractable view device.

BACKGROUND ART

Electric retractable mirrors for a vehicle (hereinafter may be abbreviated as "electric retractable mirror (s)") generally have the following configuration. A shaft is provided upright on the vehicle body side. A rotating body is supported by the shaft so as to be rotatable in a direction around an axis of the shaft. In the rotating body, e.g., a motor and a circuit board are mounted. A power transmission mechanism is disposed between the rotating body and the shaft. In an electric retractable mirror having such configuration as above, a motor is driven via a circuit mounted on a circuit board. A driving force of the motor is transmitted to the shaft via the power transmission mechanism. Consequently, the rotating body is reversibly rotated in the direction around the axis of the shaft. In this way, electric retracting/extending operation of the rotating body is performed. As a form of disposition of a motor in such type of electric retractable mirror, there is one in which a motor is disposed at a position lateral to the shaft and a motor shaft (output shaft or rotation axis rod) of the motor is disposed so as to face downward. Examples of electric retractable mirrors having such motor disposition form are described in Patent Literatures 1 and 2. In each of the electric retractable mirrors described in Patent Literatures 1 and 2, a circuit board is disposed vertically between a shaft and a motor with front and back surfaces thereof facing the shaft and the motor, respectively (in other words, with a thickness direction of the circuit board aligned with a direction connecting the shaft and the motor). The circuit board includes motor connection terminals and a connector connection terminal. The motor connection terminals are connected to terminals (motor terminals) of the motor. A connector of a wire harness (external electric power supply wiring) is connected to the connector connection terminal. In the electric retractable mirror described in Patent Literature 1, the connector connection terminal is disposed at an upper end of the circuit board so as to face upward. In the electric retractable mirror described in Patent Literature 2, the connector connection terminal is disposed on a surface of the circuit board, the surface facing the motor, so as to face a direction orthogonal to an axis of the motor.

Also, as an electric retracting unit of a conventional electric retractable mirror in practical use, there is one illustrated in FIG. 10. In this electric retracting unit 109, a circuit board 110 is formed of a ring-like board. A top of a shaft 112 is inserted to a circular hole 114 at a center of the circuit board 110. On the circuit board 110, motor connection terminals (male terminals) 116 are mounted. The motor connection terminals 116 are inserted to terminals (motor terminals or female terminals) 120 of a motor 118. In this way, the circuit board 110 is disposed in the electric retracting unit 109 horizontally (in a direction in which a board surface is orthogonal to an axis of the shaft). On the circuit board 110, a connector receiving tool (socket) 122 is mounted. Inside the connector receiving tool 122, a connector connection terminal (not illustrated) is disposed. A connector inlet 122a of the connector receiving tool 122 faces a sideways direction (which means a sideway direction relative to an upright direction). A cover 124 forming an upper part of a casing is put on the motor 118 and the circuit board 110. In a vertical surface 124a of the cover 124, a connector insertion port (not illustrated) is provided. The connector insertion port is provided at a position facing the connector inlet 122a of the connector receiving tool 122. A connector (not illustrated) of the wire harness is inserted from the connector insertion port to the connector receiving tool 122 through the connector inlet 122a. Consequently, the connector is connected to the connector connection terminal inside the connector receiving tool 122.

CITATION LIST

Patent Literature

Patent Literature 1: Japanese Patent Laid-Open No. 2013-241107 (FIG. 3)
Patent Literature 2: Japanese Patent Laid-Open No. 2014-024387 (FIG. 2)

SUMMARY OF INVENTION

Technical Problem

Since an inner space of an electric retractable view device is limited in size, it is desirable that a drive unit in the electric retractable view device be small. Thus, it is desired that components of the drive device be disposed in the electric retractable view device with good space efficiency. Also, like the electric retractable mirror described in Patent Literature 1, where the connector connection terminal is disposed so as to face upward, a connector insertion port formed in a cover forming an upper part of a casing opens upward, and thus, there is also a problem of entry of water from the connector insertion port.

This invention is intended to provide an electric retractable view device for a vehicle, space efficiency in the electric retractable view device being enhanced.

Solution to Problem

This invention provides one in which a circuit board including a motor connection terminal to be connected to a motor terminal and a connector connection terminal to be connected to a connector of an external electric power supply wiring is provided and in a state in which the circuit board is disposed vertically between a shaft and a motor and the motor connection terminal is connected to the motor terminal, the connector connection terminal is disposed below the motor connection terminal between the circuit board and the motor. Consequently, the connector connection terminal is efficiently disposed in the electric retractable view device for a vehicle, and thus, space efficiency of the electric retractable view device can be enhanced.

An aspect of an electric retractable view device for a vehicle according to this invention includes: a shaft provided upright on a vehicle body side; a rotating body supported by the shaft so as to be rotatable in a direction around an axis of the shaft; a motor mounted with a motor shaft facing downward, at a position lateral to the shaft in the rotating body; a power transmission mechanism that transmits a driving force of the motor to the shaft to rotate the rotating body in the direction around the axis of the shaft; and a circuit board including a circuit that supplies electric drive power to the motor, the circuit board being mounted in the rotating body, and the circuit board is disposed vertically between the shaft and the motor in such a manner that front and back surfaces of the circuit board face the shaft and the motor, respectively, with reference to a posture of the view device as mounted in a vehicle, the circuit board includes a motor connection terminal to be connected to a motor terminal of the motor and a connector connection terminal to which a connector of an external electric power supply wiring is to be connected, and in a state in which the motor connection terminal is connected to the motor terminal, the connector connection terminal is disposed below the motor connection terminal between the circuit board and the motor. Accordingly, in a state in which the motor connection terminal is connected to the motor terminal, the connector connection terminal is disposed below the motor connection terminal between the circuit board and the motor. Therefore, the connector connection terminal can be disposed effectively using a space below the motor connection terminal between the circuit board and the motor, enabling enhancement in space efficiency in the electric retractable view device.

In the electric retractable view device for a vehicle according to this invention, it is possible that a direction of connection of the connector connection terminal to the connector is a sideway direction or an obliquely sideway direction relative to an upright direction with reference to the posture of the view device as mounted in the vehicle. Accordingly; the connector of the external electric power supply wiring can be connected to the connector connection terminal without interfering with the motor connection terminal located above the connector connection terminal.

In the electric retractable view device for a vehicle according to this invention, it is possible that: the circuit board includes a connector receiving portion; the connector connection terminal is disposed inside the connector receiving portion; and the connector is inserted to the connector receiving portion and thereby connected to the connector connection terminal. Where the direction of connection of the connector connection terminal to the connector is set as the sideway direction or the obliquely sideway direction relative to the upright direction, entry of water to the connector receiving portion can be suppressed compared to a case where the connection direction is set as the upright direction.

In the electric retractable view device for a vehicle according to this invention, it is possible that a direction of connection of the connector connection terminal to the connector is set as a direction toward a front side of the vehicle in a state in which a view device rotating section of the view device is in an extended position. Accordingly; where a housing of a view device rotating section has a configuration in which an opening is included on the back side thereof and the opening is occluded by a housing cover; the connector of the external electric power supply wiring can be connected to the connector connection terminal from the back side of the view device rotating section in a state in which the opening is opened.

In the electric retractable view device for a vehicle according to this invention, it is possible that: the motor terminal includes a female terminal disposed in a side surface of the motor, the female terminal being disposed in a direction in which the female terminal faces the shaft; and the motor connection terminal includes a male terminal to be inserted to the female terminal. Accordingly, the motor connection terminal including a male terminal is inserted to the motor terminal including a female terminal and the motor connection terminal is thereby connected to the motor terminal, and at this time, the connector connection terminal can be disposed below the male terminal between the circuit board and the motor.

In the electric retractable view device for a vehicle according to this invention, it is possible that: the rotating body includes a casing; and the casing includes a connector insertion port through which the connector is inserted from an outside of the casing and connected to the connector connection terminal, at a position in a vertical surface of the casing, the position facing the connector connection terminal. Accordingly, since the connector insertion port is disposed in the vertical surface of the casing, entry of water from the connector insertion port to the inside of the casing can be suppressed compared to a case where the connector insertion port is disposed in a top surface of the casing.

In the electric retractable view device for a vehicle according to this invention, it is possible that the casing includes an overhang in at least a part of a circumference of the connector insertion port, the part being positioned on an upper side of the connector insertion port. Accordingly, the overhang enables more suppression of entry of water from the connector insertion port to the inside of the casing.

In the electric retractable view device for a vehicle according to this invention, it is possible that the casing includes a guide surface extending from a distal end of the overhang facing an open end of the connector insertion port to an outside of the open end. Accordingly, when the connector is inserted from the connector insertion port and connected to the connector connection terminal, the connector can easily be brought to the connector insertion port, enabling facilitation of the connection work.

In the electric retractable view device for a vehicle according to this invention, it is possible that the overhang and the guide surface are joined to each other in such a manner that a surface of the overhang and a surface of the guide surface are disposed orthogonal to each other. Accordingly, stiffness of the casing can be enhanced.

In the electric retractable view device for a vehicle according to this invention, it is possible that: the power transmission mechanism includes a shaft outside-fitting gear fitted on an outer circumference of the shaft; and the shaft outside-fitting gear is formed of a material including a resin as a base material. Accordingly, the shaft outside-fitting gear formed of a material including a resin as a base material has a large diameter compared to a metal shaft outside-fitting gear in order to ensure a strength necessary as a shaft outside-fitting gear. Accordingly, a space between the shaft and the motor is expanded, and therefore, the connector connection terminal can easily be disposed between the shaft and the motor.

DESCRIPTION OF EMBODIMENT

Figure 2:
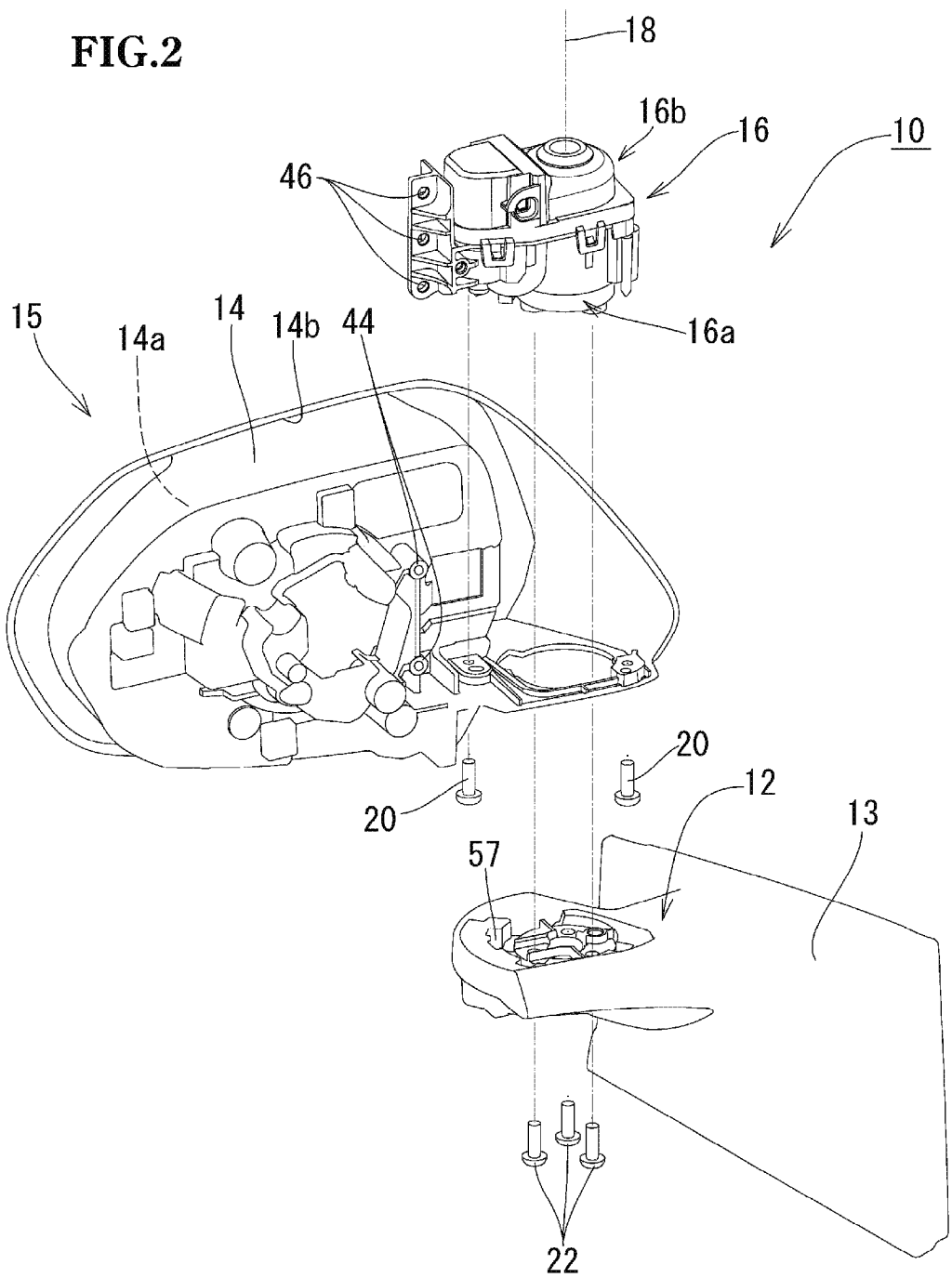
FIG. 2 is an exploded perspective view of an electric retractable door mirror for the right side of a vehicle according to an embodiment of this invention.

An embodiment of this invention will be described. FIG. 2 is an exploded perspective view of an electric retractable door mirror for the right side of a vehicle, to which this invention is applied. FIG. 2 illustrates a state of a mirror rotating section (view device rotating section) 15 in an extended position as viewed from the back side (vehicle front side). Also, in FIG. 2, illustration of, e.g., a mirror surface adjustment actuator and a mirror plate both disposed in a front opening 14a of a visor 14 and a housing cover (reference numeral 17 in FIG. 8) fitted on the back side of the visor 14 is omitted. This door mirror 10 includes a mirror base 12, the mirror rotating section 15, and an electric retracting unit 16 connected between the mirror base 12 and the mirror rotating section 15. The mirror rotating section 15 includes the visor 14. The mirror base 12 is provided so as to protrude from a vehicle body (right door) 18 to the right of the vehicle. The electric retracting unit 16 includes a fixed body 16a in a lower part and a rotating body 16b in an upper part. The rotating body 16b is rotatable relative to the fixed body 16a in a direction around a rotation axis 18. The rotating body 16b of the electric retracting unit 16 is fixed to the back side of the visor 14 by screwing two screws 20 into the rotating body 16b of the electric retracting unit 16 from a lower surface of the visor 14. In a state in which the rotating body 16b is fixed to the visor 14, the fixed body 16a of the electric retracting unit 16 is fixed to the mirror base 12 by screwing three screws 22 into the fixed body 16a of the electric retracting unit 16 from a lower surface of the mirror base 12. Consequently, the mirror rotating section 15 including the visor 14 is attached to and thereby supported on the mirror base 12 via the electric retracting unit 16 so as to be rotatable in the direction around the rotation axis 18. The housing cover (reference numeral 17 in FIG. 8) not illustrated in FIG. 2 is fitted to a back surface of the visor 14. Consequently, an opening 14b in the back surface of the visor 14 is occluded by the housing cover 17, and as a result, the electric retracting unit 16 is housed in a space surrounded by the visor 14 and the housing cover 17. The mirror rotating section 15 rotates upon being electrically driven by the electric retracting unit 16 and is movable alternatively to a retracted position and the extended position. Also, the mirror rotating section 15 is movable from the retracted position to a forward-tilted position through the extended position and vice versa upon being rotated by an external force.

Figure 3:
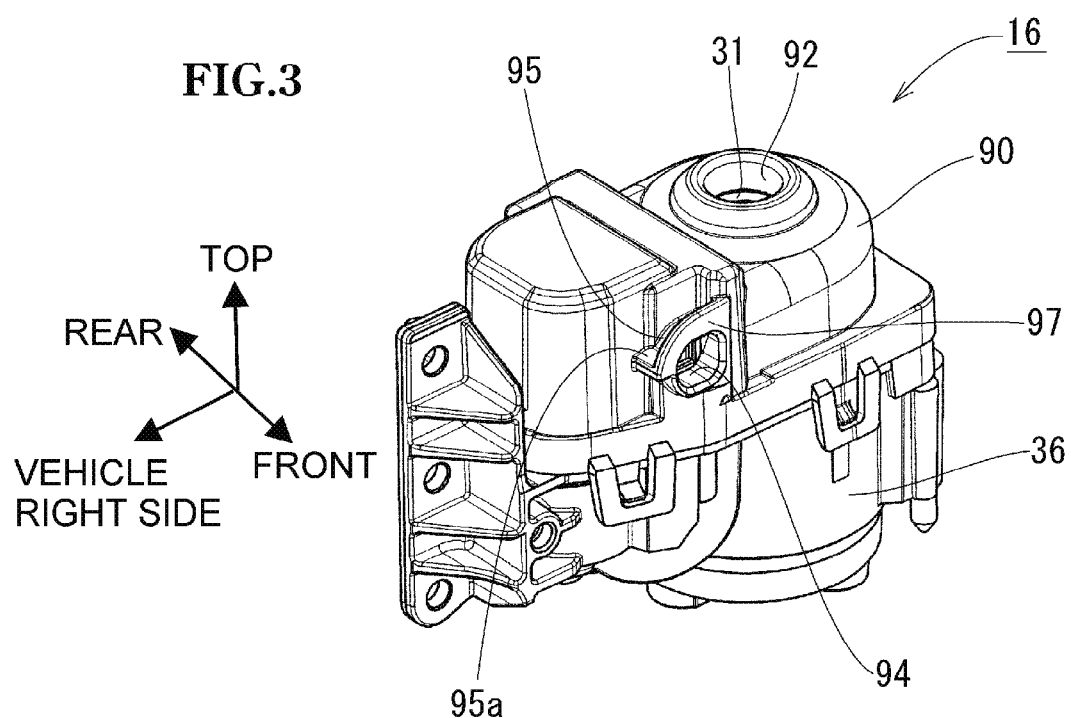
FIG. 3 is an enlarged perspective view of the electric retracting unit 16 in FIG. 2.
Figure 4:
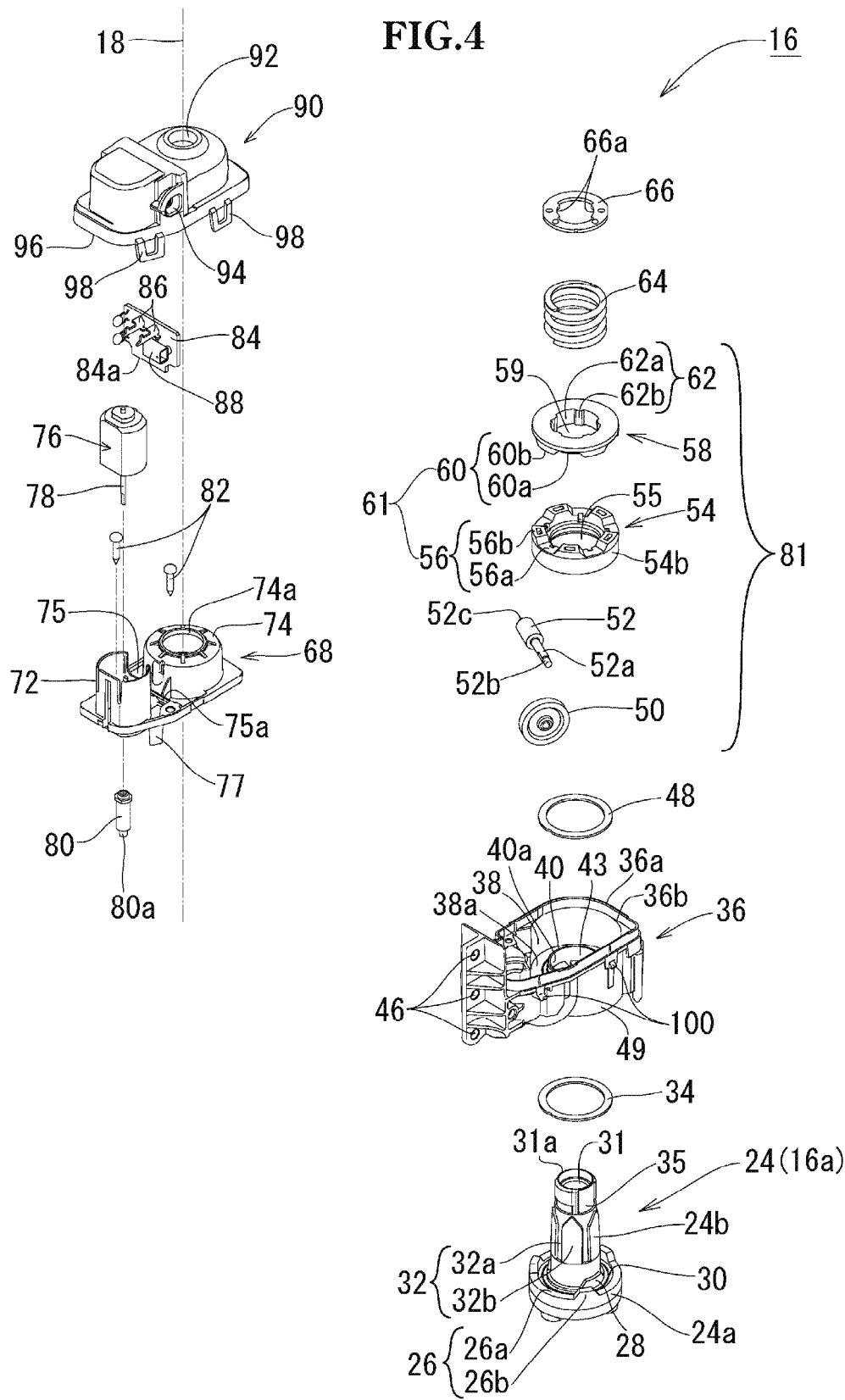
FIG. 4 is an exploded perspective view of the electric retracting unit 16 in FIG. 3.

FIG. 3 illustrates an enlargement of the electric retracting unit 16. An overall configuration of the inside of the electric retracting unit 16 will be described mainly with reference to FIG. 4. All of the components in FIG. 4 are detachably assembled into the electric retracting unit 16. The electric retracting unit 16 includes a shaft 24 forming the fixed body 16a. The shaft 24 is formed of an integrally-molded product of a reinforced resin such as PA+GF resin (glass fiber-reinforced polyimide resin). The shaft 24 coaxially includes a shaft base 24a having a large diameter and a disk-like shape in a lower part and a shaft axle 24b having a small diameter and a cylindrical shape in an upper part. The shaft 24 is provided upright so as to be orthogonal to the mirror base 12 by fixing a lower surface of the shaft base 24a to the mirror base 12 via the screws 22 (FIG. 2). A crest-valley repeated shape 26 is formed at an outermost circumferential position in an upper surface of the shaft base 24a. The crest-valley repeated shape 26 is formed of three sets of a crest 26b and a valley 26a alternately arranged in a direction around the axis of the shaft 24, the sets being each arranged with an angle of 120 degrees. A circumferential length (angle) of one valley 26a is longer than a circumferential length (angle) of one crest 26b. Also, two height maintaining protrusions 28 are formed at respective innermost circumferential positions in the upper surface of the shaft base 24a. These two height maintaining protrusions 28 are disposed so as to be spaced 180 degrees in the direction around the axis of the shaft 24 from each other and are connected to an outer circumferential surface of the shaft axle 24b. Top surfaces of the height maintaining protrusions 28 and top surfaces of height maintaining protrusions 41 of a later-described frame 36 are in abutment with and slide on each other when the mirror rotating section 15 is moved from the extended position toward the forward-tilted position by an external force. The abutment and sliding between the top surfaces causes the height maintaining protrusions 28 to maintain a height of the frame 36 relative to the shaft 24 and thereby enable the mirror rotating section 15 to be electrically returned from the forward-tilted position to the extended position. Also, a bearing surface 30 is formed at a radial position between the crest-valley repeated shape 26 at the outermost circumferential position and the height maintaining protrusions 28 at the innermost circumferential position in the upper surface of the shaft base 24a. The bearing surface 30 is formed so as to have a groove shape having a constant width, have an annular shape in the direction around the axis of the shaft 24 and be flat. A resin washer 34 is placed and received in the groove of the bearing surface 30. A hollow 31 of the shaft axle 24b is provided so as to extend through the shaft base 24a. A non-illustrated wire harness (external electric power supply wiring) that supplies electric power to, e.g., the electric retracting unit 16 and the mirror surface adjustment actuator is inserted through the hollow 31. A rotation preventing shape 32 is formed at the outer circumferential surface of the shaft axle 24b. The rotation preventing shape 32 is formed of five sets of a rotation preventing recess 32a and a rotation preventing projection 32b arranged alternately circumferentially, the sets being each arranged with a same circumferential length. The respective rotation preventing recesses 32a and the respective rotation preventing projections 32b are configured so as to extend in the axis direction of the shaft 24. An upper end of each rotation preventing recess 32a opens upward in order to allow entry of a corresponding rotation preventing projection (a rotation preventing projection 62b formed on an inner circumferential surface of a later-described clutch plate 58) to be fitted in the rotation preventing recess 32a. In an outer circumferential surface of an upper part of the shaft axle 24b, grooves 35 for allowing a later-described metal plate 66 to be put onto the upper part of the shaft axle 24b and to be rotated and to be held at the upper part of the shaft axle 24b are formed.

Figure 5:
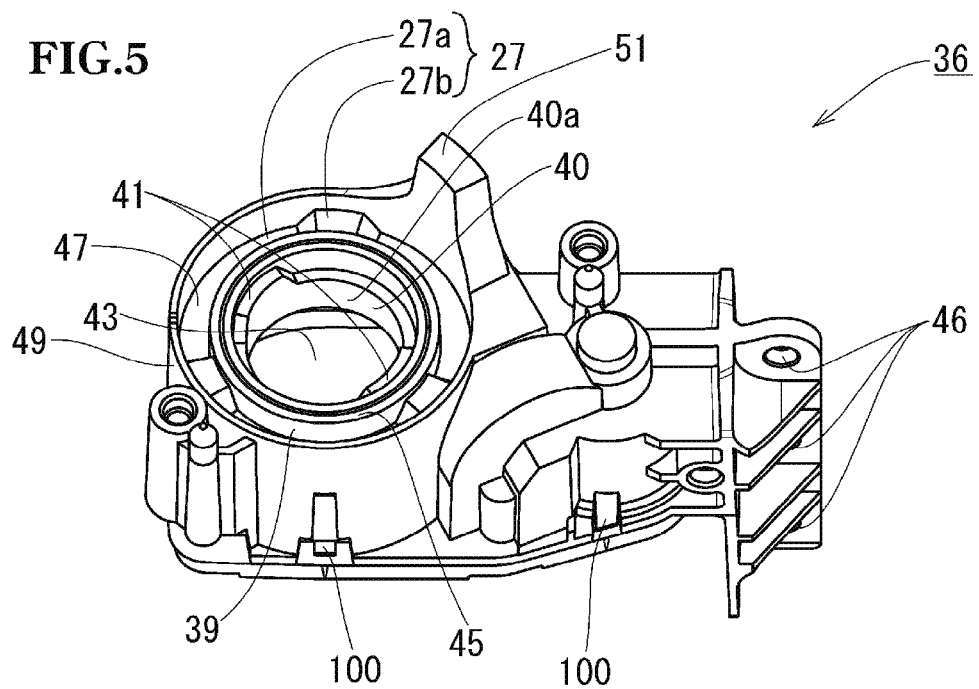
FIG. 5 is a perspective view of the frame 36 illustrated in FIG. 4 as viewed from the bottom side.

The frame 36 (which forms a casing of the rotating body 16b jointly with a later-described seal cap 90) of the rotating body 16b is rotatably supported on the shaft 24. The frame 36 is formed of an integrally-molded product of a reinforced resin such as PA+GF resin. The frame 36 includes an inner space 38 that opens upward. At a bottom surface 38a of the inner space 38, a cylinder 40 is provided upright. A hollow 43 of the cylinder 40 extends through the bottom surface 38a. Here, the referenced drawing will temporarily be moved from FIG. 4 to FIG. 5 to describe a configuration of a lower surface of the frame 36. On the lower surface of the frame 36, a cylinder 39 is provided so as to protrude downward (upward in FIG. 5). The cylinder 39 is disposed coaxially with the cylinder 40. Also, the cylinder 39 is larger in diameter and thickness than the cylinder 40. On an inner circumferential surface of the cylinder 39, two height maintaining protrusions 41 are formed. These two height maintaining protrusions 41 are disposed so as to be spaced 180 degrees in a direction around an axis of the cylinder 9 from each other and are connected to the inner circumferential surface of the cylinder 39. The top surfaces of the two height maintaining protrusions 41 and the top surfaces of the two height maintaining protrusions 28 (FIG. 4) of the shaft base 24a are in abutment with and slide on each other. An inner circumferential surface of each height maintaining protrusion 41 is located at a same radial position as the inner circumferential surface 40a of the cylinder 40, and both inner circumferential surfaces form a continuous surface. The height maintaining protrusions 28, 41 are located at a same radial position. A lower end face of the cylinder 9 forms a bearing surface 45 that faces the bearing surface 30 of the shaft 24. On the outer side of the cylinder 39, an outer barrel 49 is disposed coaxially with the cylinder 39 with a void 47 therebetween. Inside the void 47, a crest-valley repeated shape 27 to be fitted to the crest-valley repeated shape 26 (FIG. 4) in the upper surface of the shaft base 24a is formed. The crest-valley repeated shape 27 is formed of three sets of a crest 27b and a valley 27a alternately arranged in the direction around the axis of the cylinder 39, the sets being each arranged with an angle of 120 degrees. A circumferential length (angle) of one valley 27a is longer than a circumferential length (angle) of one crest 27b. Each crest 27b is disposed so as to be connected to an outer circumferential surface of the cylinder 39, an inner circumferential surface of the outer barrel 49 and a bottom surface of the void 47. In a partial circumferential area of the outer barrel 49, a stopper 51 is formed so as to protrude downward (upward in FIG. 5). The stopper 51 is inserted to a stopper groove 57 (FIG. 2) formed in the mirror base 12 so as to be movable circumferentially, and thus sets a maximum rotation range (from the retracted position to the forward-tilted position) of the mirror rotating section 15. The shaft axle 24b is inserted to a continuous hollow 43 of the cylinders 39, 40 of the frame 36 from the cylinder 39 side. At this time, the bearing surface 45 of the frame 36 is bearing-supported by the bearing surface 30 of the shaft 24 with the resin washer 34 therebetween. Also, the inner circumferential surface 40a of the cylinder 40 on the upper side is rotatably supported by the shaft axle 24b. Consequently, the frame 36 is supported by the shaft 24 so as to be rotatable in the direction around the axis of the shaft 24. The crests 26b of the crest-valley repeated shape 26 of the shaft 24 enters the void 47 in a bottom of the frame 36. In this state, the crest-valley repeated shape 26 and the crest-valley repeated shape 27 fitted together so as to be slidable on each other in both rotation directions within a predetermined angle range. In other words, the crest-valley repeated shape 26 and the crest-valley repeated shape 27 can slide on each other in both rotation directions until an inclined surface of a boundary between each crest 26b and the corresponding valley 26a and an inclined surface of a boundary between each crest 27b and the corresponding valley 27a are brought into abutment with and thereby locked by each other (or, in the retracting direction, until the stopper 51 is locked by one end of the stopper groove 57). This sliding allows the mirror rotating section 15 (FIG. 2) to rotate between the retracted position and the extended position. Also, when an external force directed to the front side of the vehicle, the external force having a predetermined value or more, is applied to the mirror rotating section 15 in the extended position, the crests 26b and the crests 27b mutually slide up on the inclined surfaces of the respective opposite crests against a biasing force of a later-described coil spring 64 and move onto the top surfaces of the respective opposite crests, whereby the fit between the crest-valley repeated shape 26 and the crest-valley repeated shape 27 is cancelled. The cancellation of the fit allows the mirror rotating section 15 to rotate to the forward-tilted position. On one side of the frame 36, screw through holes 46 for screw-fastening and thereby fixing the frame 36 to bosses 44 (FIG. 2) provided at two, upper and lower, positions in the back surface of the visor 14 are formed. In this embodiment, the screw through holes 46 are provided at three, upper, intermediate and lower, positions. From among the screw through holes 46, screws (not illustrated) are inserted to the screw through holes 46 at the two, upper and lower, positions and screwed into the bosses 44 at the two, upper and lower, positions, whereby the frame 36 is fixed to the back surface of the visor 14.

Figure 8:
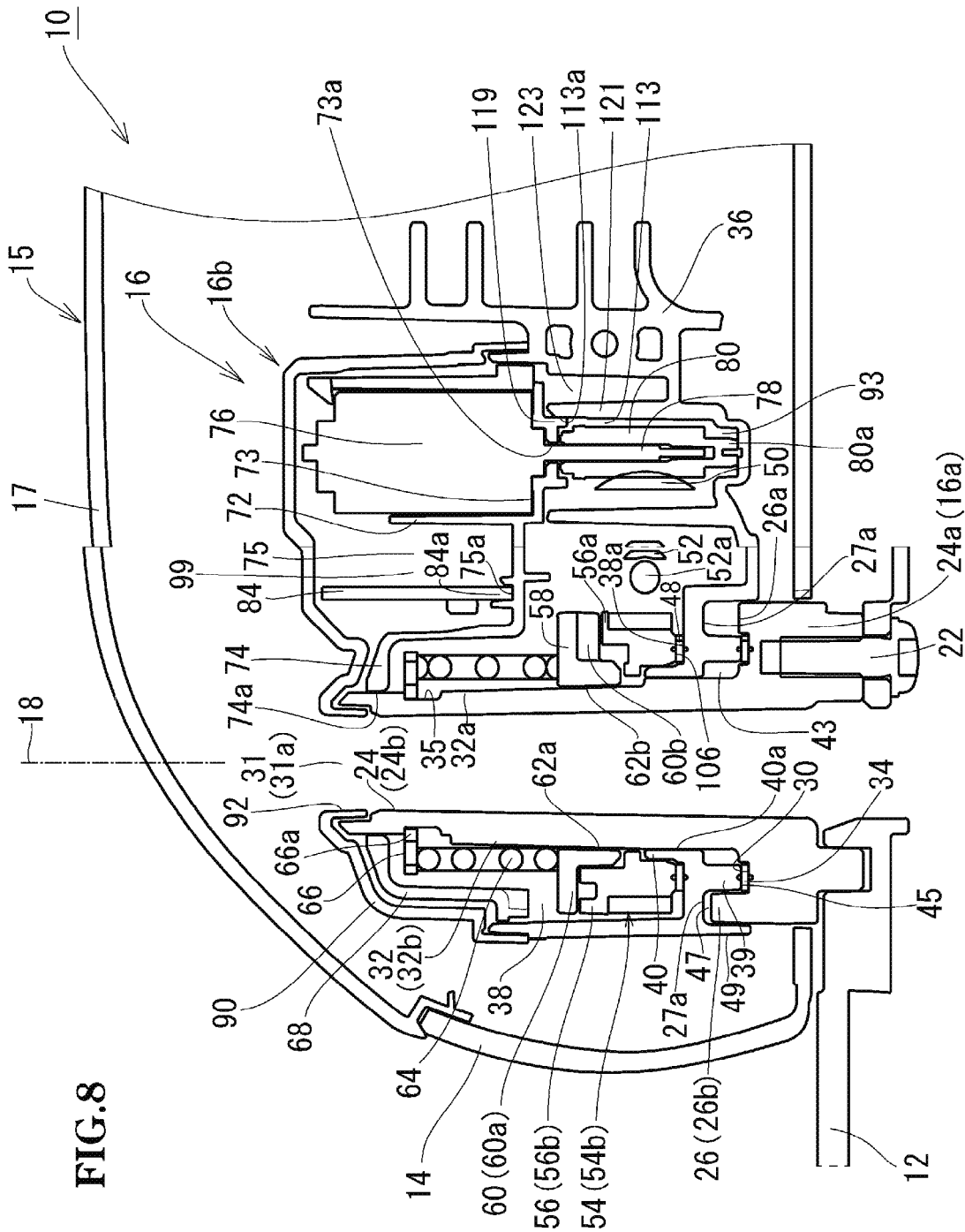
FIG. 8 is a diagram illustrating an assembled state of the door mirror 10 in FIG. 2 and is a diagram of an end face cut at the position indicated by arrows A-A in FIG. 9.

Referring back to FIG. 4, a resin washer 48 is loosely fitted on an outer circumference of the cylinder 40 in the inner space 38 of the frame 36. The resin washer 48 is placed and supported on the bottom surface 38a of the inner space 38. The resin washer 48 is a product that is the same as the resin washer 34. An axle 52a of a metal worm 52 is inserted to a resin worm wheel 50, whereby the worm wheel 50 and the worm 52 are assembled to each other so as to be unrotatable relative to each other. The assembled worm wheel 50 and worm 52 are put in the inner space 38 of the frame 36 and disposed at a predetermined position. At this time, lower surfaces of opposite ends 52b, 52c of the axle 52a of the worm 52 are placed and supported on bearings (reference numerals 38b, 38c in FIG. 6) in the inner space 38. Consequently, the worm wheel 50 and the worm 52 can rotate integrally in the inner space 38. A shaft outside-fitting gear 54 is rotatably fitted on the outer circumference of the cylinder 40 in the inner space 38 of the frame 36. The shaft outside-fitting gear 54 is formed of an integrally-molded product of a reinforced resin such as PA+GF resin. A hollow 55 is formed in a center of a surface of the shaft outside-fitting gear 54 as viewed in an axis direction of the shaft outside-fitting gear 54. The cylinder 40 of the frame 36 and the shaft axle 24b are rotatably inserted to the hollow 55. A bearing surface 106 (FIG. 8) in a lower surface of the shaft outside-fitting gear 54 is slidably placed and supported on the resin washer 48 (FIG. 8). At an outer circumferential surface of the shaft outside-fitting gear 54, gear teeth 54b of a helical gear are formed. Consequently, the shaft outside-fitting gear 54 forms a worm wheel. The gear teeth 54b engage with the worm 52. Consequently, the shaft outside-fitting gear 54 and the worm 52 form a worm gear. A shaft outside-fitting gear-side clutch surface 56 is formed at an upper surface of the shaft outside-fitting gear 54. The shaft outside-fitting gear-side clutch surface 56 is formed of five sets of a clutch valley 56a and a clutch crest 56b arranged alternately in a direction around an axis of the shaft outside-fitting gear 54, the sets being each arranged with a same circumferential length. A circumferential length (angle) of one clutch valley 56a and a circumferential length (angle) of one clutch crest 56b are set to be equal to each other.

The clutch plate 58 is put onto the shaft axle 24b. Consequently, the clutch plate 58 is placed and supported on the shaft outside-fitting gear 54 concentrically with the shaft outside-fitting gear 54. The clutch plate 58 is formed of an integrally-molded product of a reinforced resin such as PA+GF resin. A hollow 59, to which the shaft axle 24b is inserted so as to be unrotatable and movable axially, is formed in a center of a surface of the clutch plate 58 as viewed in an axis direction of the clutch plate 58. At a lower surface of the clutch plate 58, a shaft-side clutch surface 60 is formed. The shaft-side clutch surface 60 is formed of five sets of a clutch valley 60a and a clutch crest 60b arranged alternately in a direction around the axis of the clutch plate 58, the sets being each arranged with a same circumferential length. The shaft outside-fitting gear-side clutch surface 56 and the shaft-side clutch surface 60 form a clutch mechanism 61. A circumferential length (angle) of one clutch valley 60a and a circumferential length (angle) of one clutch crest 60b of the shaft-side clutch surface 60 are set to be equal to each other. Also, the shaft outside-fitting gear-side clutch surface 56 and the shaft-side clutch surface 60 are equal to each other in inner diameter and outer diameter. Therefore, the clutch valleys 56a and the clutch crests 56b of the shaft outside-fitting gear-side clutch surface 56 are fitted to the clutch crests 60b and the clutch valleys 60a of the shaft-side clutch surface 60 with no backlash. A height changing part at a position of a boundary between each clutch valley 56a and the relevant clutch crest 56b and a height changing part at a position of a boundary between each clutch valley 60a and the relevant clutch crest 60b are formed of respective inclined surfaces, inclination angles of which are equal to each other. Consequently, the fit between the shaft outside-fitting gear-side clutch surface 56 and the shaft-side clutch surface 60 can be cancelled by means of a rotational force acting between these clutch surfaces 56, 60. A rotation preventing shape 62 is formed at an inner circumferential surface of the clutch plate 58. The rotation preventing shape 62 is formed of five sets of a rotation preventing recess 62a and the rotation preventing projection 62b that are arranged circumferentially and extend axially. The rotation preventing recesses 62a and the rotation preventing projections 62b face the rotation preventing projections 32b and the rotation preventing recesses 32a formed at the outer circumferential surface of the shaft axle 24b, respectively, via a small gap. Consequently, the rotation preventing recesses 62a and the rotation preventing projections 62b are fitted to the rotation preventing projections 32b and the rotation preventing recesses 32a so as to be unrotatable in the direction around the axis and slidable axially. As a result, the clutch plate 58 is fitted on the shaft axle 24b so as to be unrotatable in a direction around the axis of the shaft axle 24b and movable axially.

The coil spring 64 is put on the shaft axle 24b. Consequently, the coil spring 64 is placed and supported on the clutch plate 58 concentrically with the clutch plate 58. The metal plate 66 is disposed on the coil spring 64. The coil spring 64 is pressed and contracted by the metal plate 66, whereby the metal plate 66 is put onto the shaft axle 24b. Protrusions 66a formed at an inner circumferential surface of the metal plate 66 are inserted to the grooves 35 formed in the outer circumferential surface of the upper part of the shaft axle 24b and the metal plate 66 is pressed downward, and next, the metal plate 66 is rotated, whereby the metal plate 66 is fitted to the upper part of the shaft axle 24b. Consequently, the coil spring 64 is fitted in a contracted state to the shaft axle 24b. At this time, an expansion force of the coil spring 64 acts between an upper surface of the clutch plate 58 and a lower surface of the metal plate 66. This expansion force provides a fitting force between the crest-valley repeated shape 26 at the upper surface of the shaft base 24a and the crest-valley repeated shape 27 (FIG. 5) at the lower surface of the frame 36 and also between the shaft outside-fitting gear-side clutch surface 56 at the upper surface of the shaft outside-fitting gear 54 and the shaft-side clutch surface 60 at the lower surface of the clutch plate 58. However, when the mirror rotating section 15 is located between the retracted position and the extended position, the expansion force provided from the coil spring 64 to the frame 36 is received by the bearing surface 30 via the resin washer 34 through the bearing surface 45, and thus, rotation of the mirror rotating section 15 is performed by the bearing surfaces 45, 30 sliding on each other with the resin washer 34 therebetween. In other words, the rotation of the mirror rotating section 15 is bearing-supported by the abutment and sliding between the bearing surfaces 45, 30 with the resin washer 34 therebetween. Therefore, at this time, the opposed surfaces of the crest-valley repeated shapes 26, 27 are separated and are neither in abutment with nor slide on each other (see FIG. 8).

After assembly of all of the respective components illustrated on the right side of FIG. 4, an outer plate 68 is placed on a step 36b on the inner circumferential side of an opening 36a at an upper end of the frame 36 and then the opening 36a is thus closed. The outer plate 68 is formed of an integrally-molded product of a resin such as POM (polyacetal). The outer plate 68 includes a barrel 72 and a dome 74 at an upper surface thereof. The barrel 72 receives and holds a motor 76. The dome 74 surrounds an upper part of the shaft axle 24b, the upper part protruding upward from the opening 36a of the frame 36, and the coil spring 64 and the metal plate 66. A circular hole 74a that allows the upper part of the shaft axle 24b to protrude therefrom is provided in a center of a surface of the dome 74 as viewed in an axis direction of the dome. Before the outer plate 68 is put on the frame 36, the motor 76 is inserted to the barrel 72 from above and the motor 76 is thus fitted to the outer plate 68. A motor shaft (output shaft or rotation axis rod) 78 of the motor 76 protrudes vertically downward below the outer plate 68 through a hole 73a formed in a center of a bottom 73 (FIG. 8) in the barrel 72. A worm 80 is fitted onto the motor shaft 78. In a state in which the outer plate 68 holds the motor 76 and the worm 80 in this way, the outer plate 68 is placed on the step 36b on the inner circumferential side of the opening 36a of the frame 36. At this time, the worm 80 and the worm wheel 50 engage with each other and form a worm gear. Also, the worm 80, the worm wheel 50, the worm 52, the shaft outside-fitting gear 54 and the clutch plate 58 form a power transmission mechanism 81 that transmits a driving force of the motor 76 to the shaft axle 24b. Also, at a lower surface of the outer plate 68, two protruding pieces 77 are formed so as to protrude downward from the lower surface. In FIG. 4, only the near-side protruding piece 77 of the two protruding pieces 77 is shown. The other protruding piece 77 is located on the side diagonally opposed to the near-side protruding piece 77. Lower end faces of the two protruding pieces 77 face upper surfaces of the opposite ends 52b, 52c of the axle 52a of the worm 52 via a small gap, respectively, whereby upward movement of the worm 52 and the worm wheel 50 is restricted. After the placement of the outer plate 68 on the step 36b on the inner circumferential side of the opening 36a of the frame 36, the outer plate 68 is fixed to the frame 36 via two screws 82.

Figure 6:
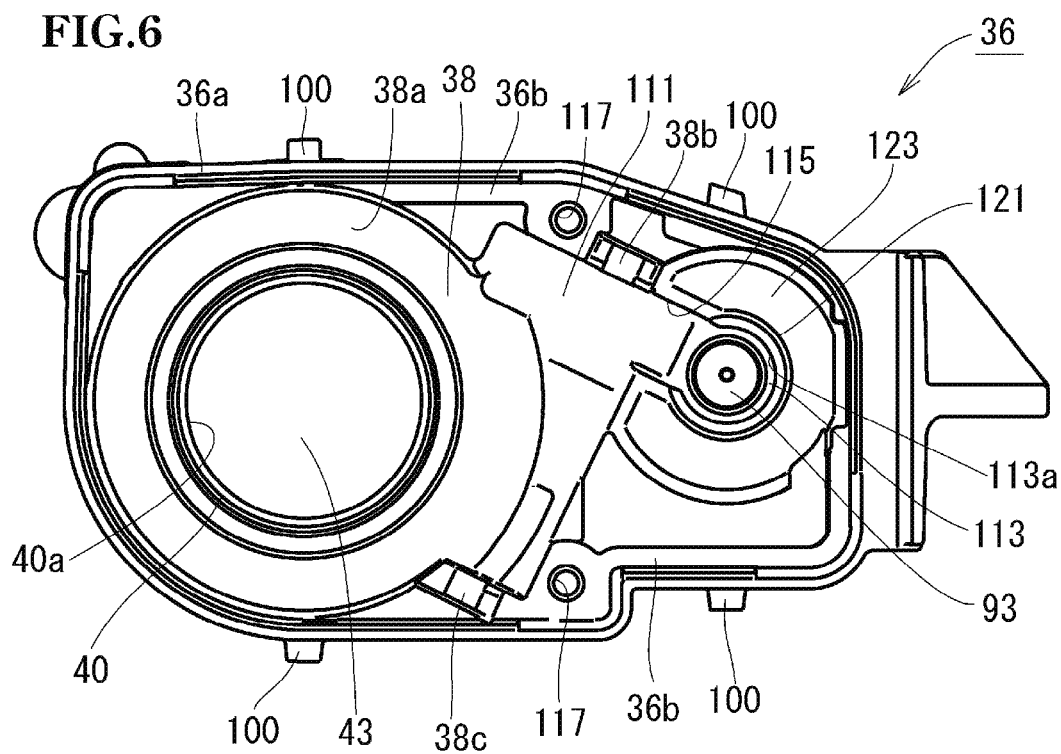
FIG. 6 is a plan view of the frame 36 in FIG. 4.

A configuration of the inside of the inner space 38 of the frame 36 will be described with reference to FIG. 6. Inside the inner space 38 of the frame 36, in addition to the components already described, e.g., a worm wheel receiving space 111, a worm receiving space 113, a worm wheel entry port 115 and two screw holes 117 are formed. The worm wheel receiving space 111 receives the worm wheel 50 coaxially fixed and fitted to the axle 52a of the worm 52. At this time, the opposite ends 52b, 52c of the axle 52a of the worm 52 are supported on the bearings 38b, 38c. The worm receiving space 113 is a space that coaxially receives the worm 80, and is formed of a space having a circular column shape having a diameter that is larger than that of the worm 80. The worm wheel entry port 115 causes the worm wheel receiving space 111 and the worm receiving space 113 to communicate with each other. Consequently, the worm wheel entry port 115 causes an outer circumferential surface of the worm wheel 50 to enter the worm receiving space 113 through the worm wheel entry port 115. As a result, the worm wheel 50 and the worm 80 engage with each other. The two screw holes 117 are screw holes for screw-in of the two screws 82 (FIG. 4) for fixing the outer plate 68 to the frame 36. A bearing recess 93 having a diameter that is smaller than a general diameter of the worm receiving space 113 is formed in a bottom of the worm receiving space 113. Grease is charged in the bearing recess 93, and a distal end 80a (FIGS. 4 and 8) of the worm 80 is received in the bearing recess 93. Consequently, the distal end 80a of the worm 80 is bearing-supported in the bearing recess 93. At the lower surface of the outer plate 68, a circular projection 119 (FIG. 8) is formed concentrically with the hole 73a (hole for letting the motor shaft 78 through; FIG. 8) in the lower surface of the outer plate 68. The projection 119 is received in a circular upper opening 113a of the worm receiving space 113. At this time, the projection 119 is received in the upper opening 113a with no gap (or with almost no gap) therearound except a part facing the worm wheel entry port 115. Consequently, an area that is no less than a half of an entire outer circumferential surface of the projection 119 is surrounded and supported by an inner circumferential surface of the upper opening 113a. As a result, the motor shaft 78 protruding from the hole 73a at a center of the projection 119 is positioned relative to the worm receiving space 113 in a surface direction perpendicular to an axis of the motor shaft 78. Around the worm receiving space 113, a cylindrical wall 121 having a constant thickness is provided, and a deep lightening hole 123 is provided outside the cylindrical wall 121. The lightening hole 123 is formed at a place excluding the part facing the worm wheel entry port 115, and consequently, the lightening hole 123 is formed in a C shape in plan view. The provision of the lightening hole 123 enables suppression of sink marks accompanying resin molding of the frame 36 and thus enables enhancement in molding accuracy of the upper opening 113a of the worm receiving space 113. Consequently, an accuracy of positioning of the motor shaft 78 relative to the worm receiving space 113 in the surface direction perpendicular to the axis of the motor shaft 78 is improved. As a result, the engagement between the worm 80 and the worm wheel 50 is maintained in a normal state, enabling operating sound generated when the worm 80 and the worm wheel 50 rotate in engagement can be maintained at a normal level.

After the fixation of the outer plate 68 to the frame 36, a circuit board (printed board) 84 is disposed upright in a space 75, between the barrel 72 and the dome 74, of the upper surface of the outer plate 68 (in other words, a space between the motor 76 and the shaft axle 24b). Since the shaft outside-fitting gear 54 is formed of a material including a resin as a base material, the shaft outside-fitting gear 54 has a large diameter compared to a metal shaft outside-fitting gear in order to ensure a strength necessary as a shaft outside-fitting gear. Accordingly, the space 75 between the motor 76 and the shaft axle 24b is expanded. Therefore, even if an entire thickness of the circuit board 84 with a connector receiving tool (socket) 88, etc., mounted thereon is large because of the mounting of such components on the circuit board 84, the circuit board 84 can easily be disposed in the space 75. On the circuit board 84, a motor drive circuit, motor connection terminals 86 (male terminals), the connector receiving tool 88 (socket or connector receiving portion) are mounted. The motor drive circuit supplies electric drive power to the motor 76. The motor connection terminals 86 interconnects the motor drive circuit and terminals 85 (motor terminals or female terminals, FIGS. 1 and 9; the terminals 85 are the same as the motor terminals 120 in FIG. 10 which indicates a conventional device) of the motor 76. A connector 89 (FIG. 9) at a distal end of the wire harness (not illustrated) is inserted to the connector receiving tool 88, and as a result, the connector receiving tool 88 interconnects the wire harness and the motor drive circuit. Inside the connector receiving tool 88, a connector connection terminal 91 (FIGS. 1 and 9) electrically connected to a terminal (not illustrated) of the connector 89 at the distal end of the wire harness is disposed. A lower end 84a of the circuit board 84 is inserted and supported in a groove 75a of the outer plate 68, the groove 75a being formed in a bottom of the space 75 between the barrel 72 and the dome 74. Distal ends of the motor connection terminals 86 are inserted and supported in the respective motor terminals 85. Consequently, the circuit board 84 is disposed upright in the space 75 and the motor connection terminals 86 and the motor terminals 85 are electrically connected.

After the fixation of the outer plate 68 to the frame 36 and the attachment of the circuit board 84 to the outer plate 68, the seal cap 90 is put on the outer plate 68. The seal cap 90 is formed of an integrally-molded product of a resin such as PP (polypropylene). In an upper surface of the seal cap 90, a circular hole 92 that communicates with an upper opening 31a of the hollow 31 of the shaft axle 24b is provided. Also, in one side surface of the seal cap 90, a connector insertion port 94 that communicates with a connector inlet 88a (e.g., FIG. 7) of the connector receiving tool 88 of the circuit board 84 is provided. Also, at each of four positions around an opening 96 of a lower end of the seal cap 90, a claw locking frame 98 is formed. Upon the seal cap 90 being put on the outer plate 68 and the seal cap 90 being pushed down, claws 100 configured at four positions around an upper outer circumferential surface of the frame 36 so as to protrude therefrom engage with the respective claw locking frames 98 of the seal cap 90. Consequently, the frame 36 and the seal cap 90 are joined, whereby the electric retracting unit 16 is assembled in an integrated manner. The wire harness is inserted through the hollow 31 of the shaft axle 24b of the electric retracting unit 16 assembled in this way. The wire harness includes a wiring for the electric retracting unit 16. In addition, the wire harness includes, e.g., a wiring for the mirror adjustment actuator and a wiring for a turn lamp depending on the functions included in the door mirror 10. An end on the mirror rotating section 15 side of the wire harness is drawn out from the circular hole 92 of the seal cap 90. An end on the vehicle body side of the wire harness is drawn out from a lower end of the hollow 31 of the shaft 24 and guided to the inside of the vehicle body. A connector is fitted to an end on the mirror rotating section 15 side of each wiring in the wire harness. From among the connectors, the connector 89 (FIG. 9) for a distal end of the wiring for the electric retracting unit 16 is inserted to the connector insertion port 94 and thereby connected to the connector receiving tool 88 of the circuit board 84.

Figure 7:
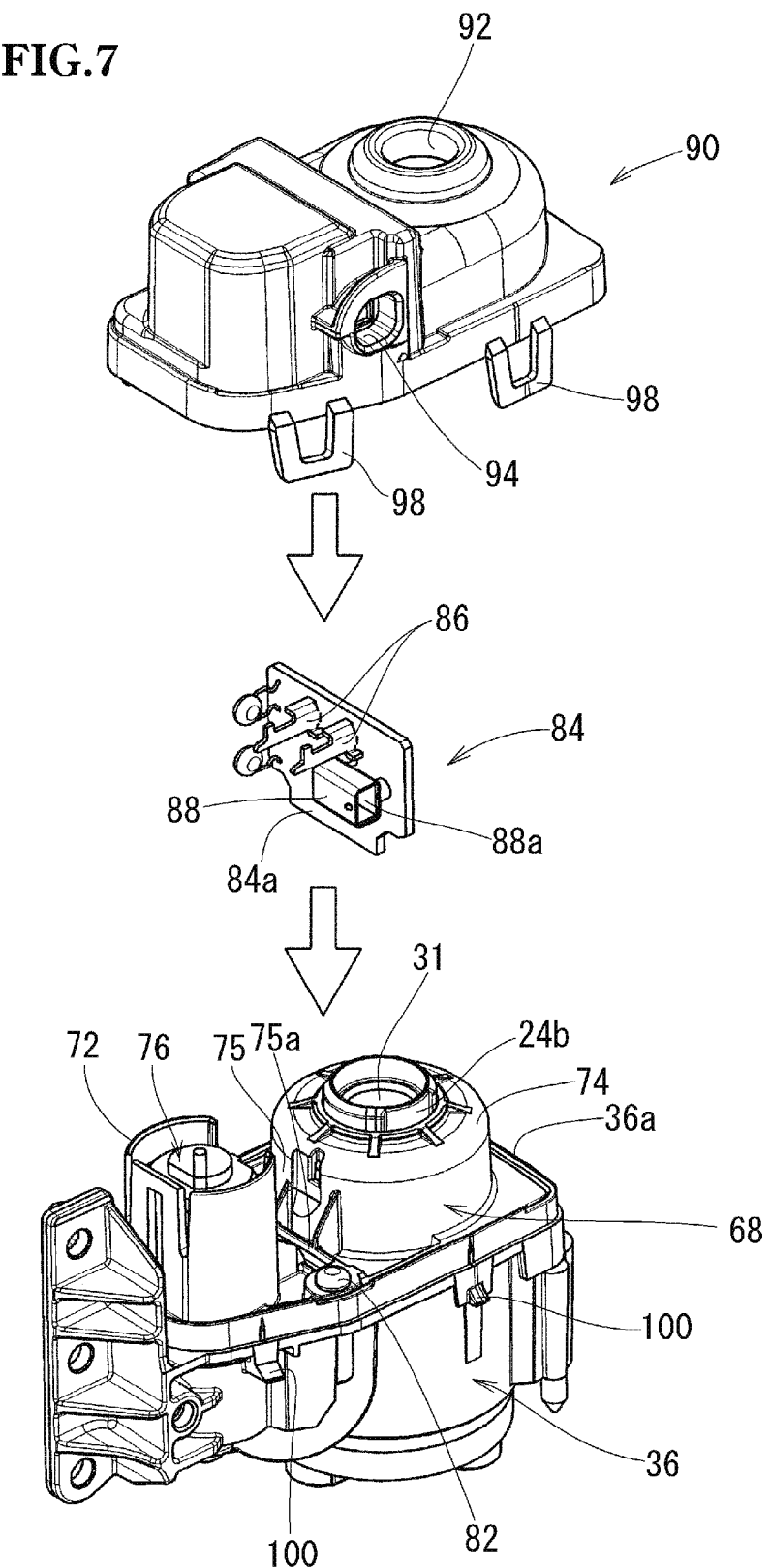
FIG. 7 is a perspective view illustrating a state in process of assembly of the respective components of the electric retracting unit 16 illustrated in FIG. 4.

FIG. 7 illustrates a manner in which the circuit board 84 and the seal cap 90 are assembled to a product in process of assembly of the electric retracting unit 16, which is illustrated in the lower part of FIG. 7. The product in process of assembly refers to a product in a state in which the respective components illustrated on the right side of FIG. 4 are assembled and the outer plate 68 holding the motor 76 and the worm 80 are fitted on the inner circumferential side of the opening 36a at the upper end of the frame 36 and fixed to the frame 36 via the two screws 82. The circuit board 84 is inserted to the space 75, between the barrel 72 and the dome 74, of the upper surface of the outer plate 68. The lower end 84a of the circuit board 84 is detachably inserted to the groove 75a of the outer plate 68. The distal ends of the motor connection terminals 86 are detachably inserted to the respective motor terminals 85. In this way, the circuit board 84 is detachably supported by the groove 75a and the motor terminals 85. Consequently, the circuit board 84 is assembled to the product in such a manner that the circuit board 84 stands upright in the space 75. After the assembly of the circuit board 84 to the product, the seal cap 90 is put on the product. Consequently, the claws 100 of the frame 36 detachably engage with the claw locking frame 98 of the seal cap 90, whereby the seal cap 90 is assembled to the product. After the assembly of the seal cap 90 to the product, the wire harness is inserted through the hollow 31 of the shaft axle 24b. In a state in which the seal cap 90 is assembled to the product, the connector inlet 88a of the connector receiving tool 88 of the circuit board 84 and the connector insertion port 94 of the seal cap 90 communicate with each other. Consequently, a state in which the connector 89 for the wiring for the electric retracting unit 16 in the wire harness can be inserted to the connector inlet 88a from the connector insertion port 94 and joined to the connector receiving tool 88 is achieved.

FIG. 8 illustrates the door mirror 10 having the above-described configuration, the door mirror 10 being cut at a position extending through respective center axes of the shaft 24 and the motor 76. This corresponds to a structure of an end face cut at the position indicated by arrows A-A in FIG. 9. FIG. 8 illustrates a state when the housing cover 17 is fitted to the visor 14, the mirror rotating section 15 is in the extended position and the shaft outside-fitting gear-side clutch surface 56 and the shaft-side clutch surface 60 engage with each other. At this time, although not shown in FIG. 8, the inclined surfaces of the boundaries between the crests 26b and the valleys 26a and the relevant inclined surfaces of the boundaries between the crests 27b and the valleys 27a are in abutment with each other and whereby the crest-valley repeated shape 26 and the crest-valley repeated shape 27 are locked by each other. In the state in which the mirror rotating section 15 is in the extended position in FIG. 8, upon an instruction for retracting being provided by operating a mirror switch, the motor 76 is started. Rotation of the motor 76 is transmitted to the shaft outside-fitting gear 54 via the worm 80, the worm wheel 50 and the worm 52. At this time, the shaft outside-fitting gear-side clutch surface 56 and the shaft-side clutch surface 60 engage with each other, and the shaft outside-fitting gear 54 is thereby unrotatable relative to the shaft axle 24b, and thus, instead, a force acts so as to rotate the frame 36 in the direction around the axis of the shaft axle 24b. Consequently, the bearing surface 30 and the bearing surface 45 slide on each other with the resin washer 34 therebetween, and the bottom surface 38a of the inner space 38 of the frame 36 and the bearing surface 106 of the lower surface of the shaft outside-fitting gear 54 slide on each other with the resin washer 48 therebetween, whereby the mirror rotating section 15 rotates in a retracting direction. Upon the rotation of the mirror rotating section 15 being physically stopped in the retracted position by engagement between the stopper 51 (FIG. 5) and the one end of stopper groove 57 (FIG. 2), the stoppage is detected and the driving of the motor 76 is stopped.

Consequently, the mirror rotating section 15 is held in the retracted position. In this state, upon an instruction for extending being provided by operating the mirror switch, the motor 76 is started in a reverse direction, whereby the mirror rotating section 15 rotates in an extending direction. Upon the rotation of the mirror rotating section 15 being stopped in the extended position by engagement between the inclined surfaces of the boundaries between the crests 26b and the valleys 26a of the crest-valley repeated shape 26 and the inclined surfaces of the boundaries between the crests 27b and the valleys 27a of the crest-valley repeated shape 27, the stoppage is detected and the driving of the motor 76 is stopped. Consequently, the mirror rotating section 15 is held in the extended position.

Figure 1:
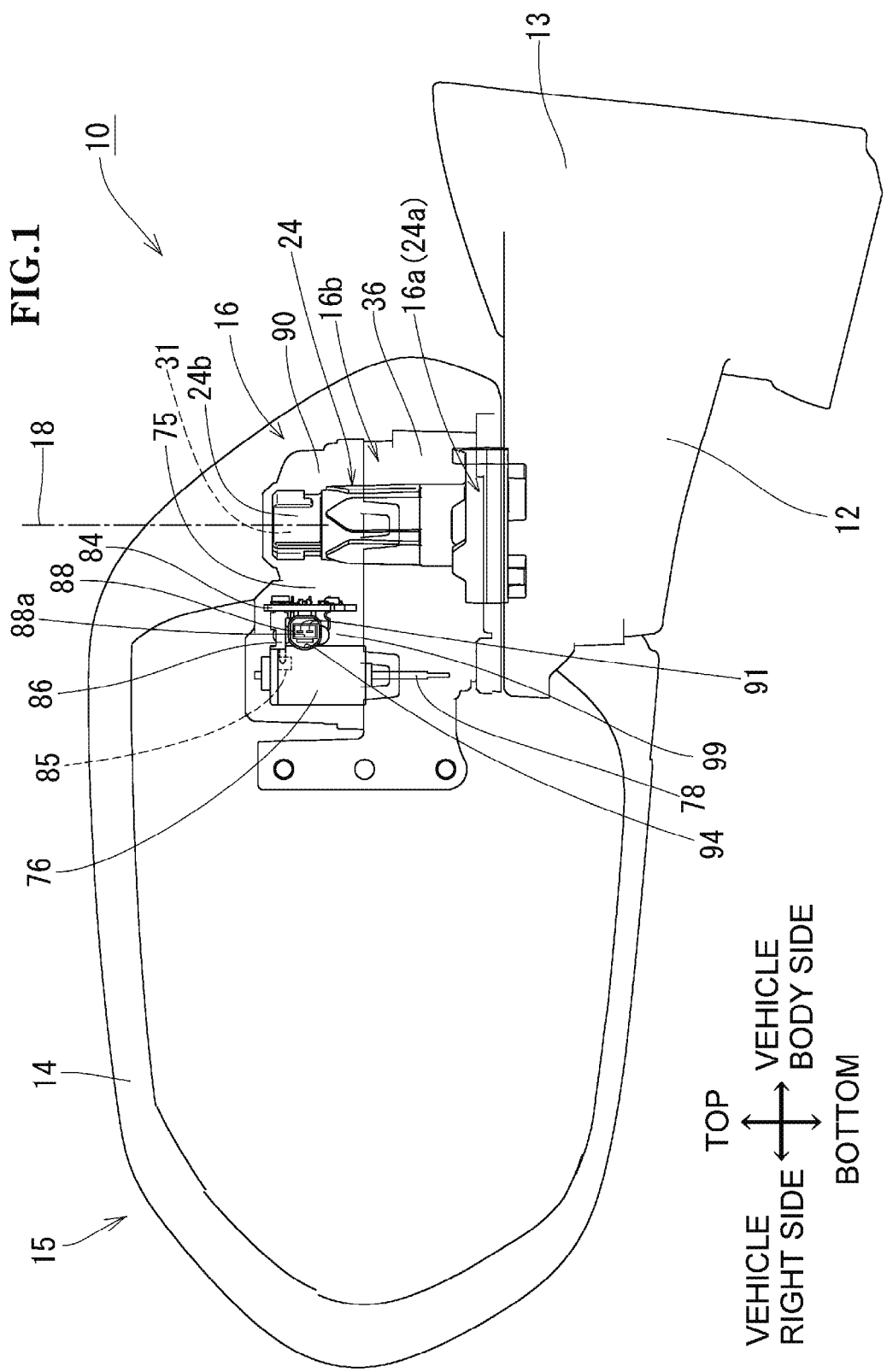
FIG. 1 is a back view illustrating an assembled state of the door mirror 10 in FIG. 2 (with a housing cover removed) and illustrates the door mirror 10 in a state in which a mirror rotating section 15 is in an extended position, as viewed from the front of the vehicle.
Figure 9:
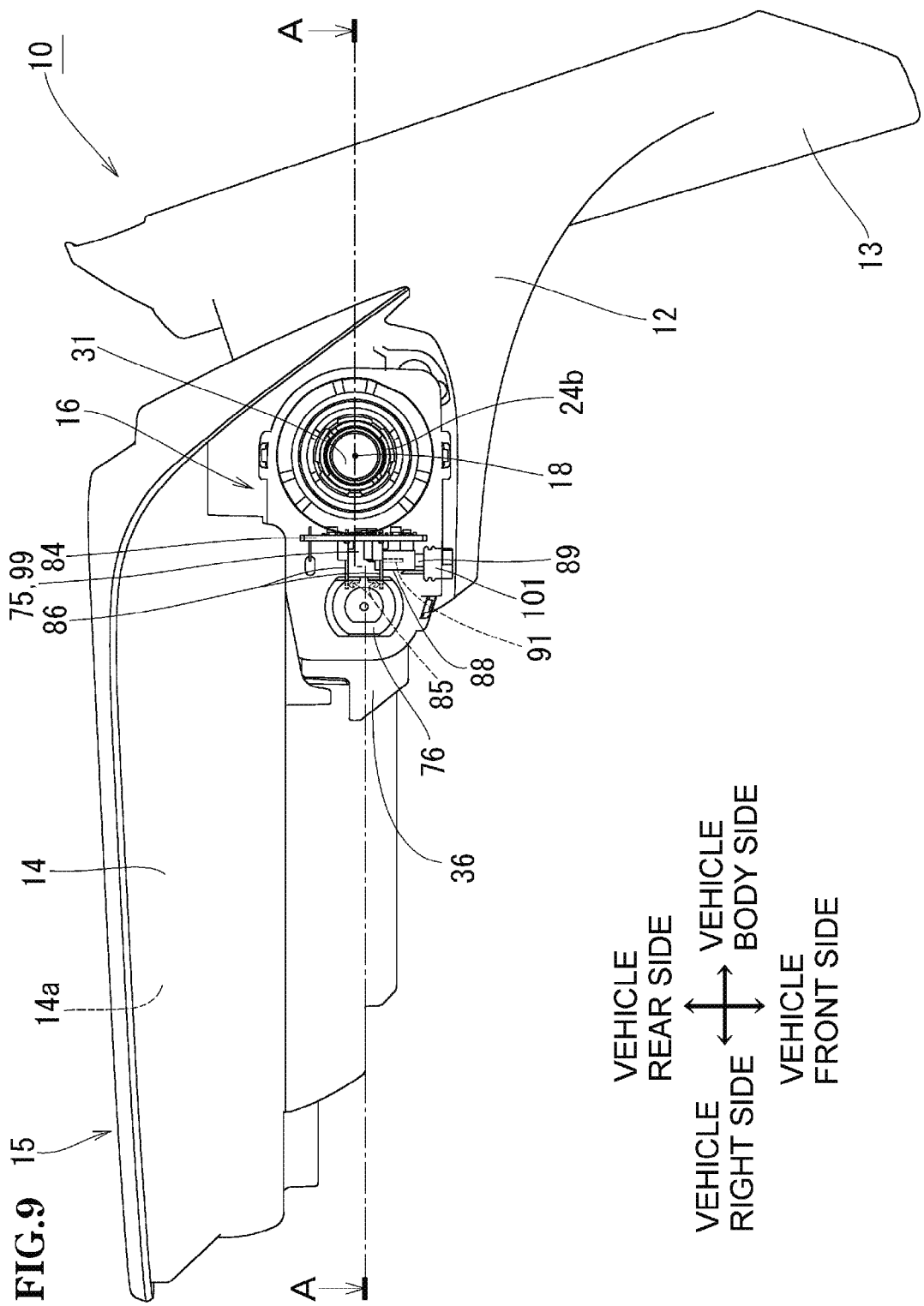
FIG. 9 is a plan view illustrating an assembled state of the door mirror 10 in FIG. 2 (with the housing cover removed) and illustrates a state of the door mirror 10 in which the mirror rotating section 15 is in the extended position.
Figure 10:
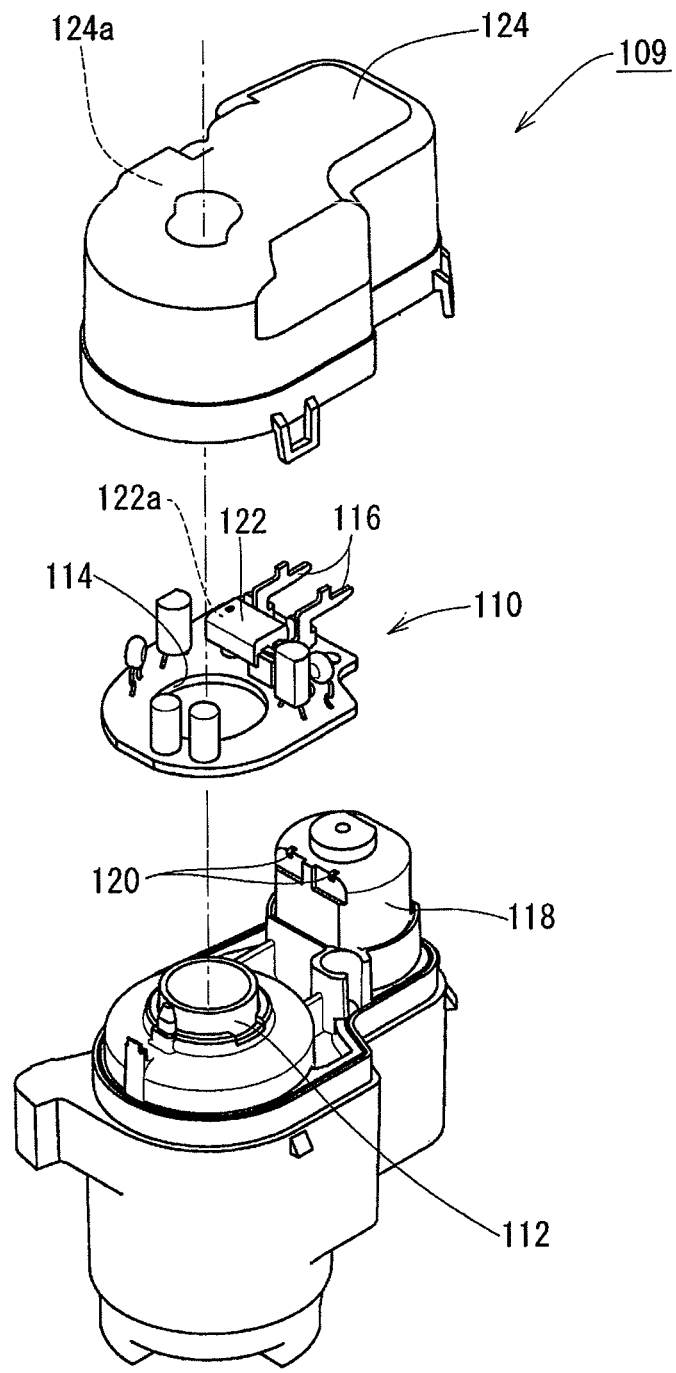
FIG. 10 is an exploded perspective view illustrating a conventional electric retracting unit in practical use.

FIGS. 1 and 9 illustrate a state in which the door mirror 10 in FIG. 2 is assembled and mounted in a vehicle. The mirror rotating section 15 is illustrated in a state in which the mirror rotating section 15 is in the extended position. FIG. 1 illustrates the door mirror 10 as viewed from the front side of the vehicle (that is, from the back side of the door mirror 10), and FIG. 9 illustrates the door mirror 10 as viewed from the upper side. FIGS. 1 and 9 each illustrate the door mirror 10 with the housing cover 17 (FIG. 8) removed and the inside of the electric retracting unit 16 seen through. Here, FIG. 9 illustrates the door mirror 10 with the connector 89 of the wiring for the electric retracting unit 16 in the wire harness inserted to the connector receiving tool 88, rubber packing 101 being attached to the connector 89. Also, FIG. 1 illustrates the door mirror 10 with the connector 89 removed from the connector receiving tool 88. In FIGS. 1 and 9, the motor connection terminals 86 of the circuit board 84 are inserted in the motor terminals 85. The lower end 84a of the circuit board 84 is inserted in the groove 75a (FIGS. 4, 7 and 8) formed in the outer plate 68. The entire circuit board 84 is disposed vertically in the space 75 between the motor 76 and the shaft axle 24b in a state in which the circuit board 84 is supported in this way. The connector receiving tool 88 that receives the connector connection terminal 91 is mounted on a surface of the circuit board 84, the surface facing the motor 76. The connector connection terminal 91 is disposed in a space 99 below the motor connection terminals 86 between the circuit board 84 and the motor 76. Consequently, the space 99 below the motor connection terminal 86 between the circuit board 84 and the motor 76 is effectively used, enhancing space efficiency in the electric retracting unit 16. Also, since in the conventional electric retracting unit 109 in FIG. 10, the circuit board 110 is disposed on an upper part of the shaft 112, a height of the electric retracting unit 109 is increased at a position of the shaft 112. In general, a space inside a mirror rotating section of a door mirror is tight in a top-bottom direction at a position of a shaft (see FIG. 1). Thus, a design in which a height of an electric retracting unit is increased at a position of a shaft is undesirable. On the other hand, according to the electric retracting unit 16 of this embodiment, the circuit board 84 is disposed in the space 75 between the motor 76 and the shaft axle 24b, enabling a height of the electric retracting unit 16 to be suppressed to be low at a position of the shaft 24. Consequently, the electric retracting unit 16 can easily be disposed inside the mirror rotating section 15. A direction of connection of the connector receiving tool 88 to the connector 89 attached to the distal end of the wiring for the electric retracting unit 16 in the wire harness (in other words, a direction of the connector inlet 88a of the connector receiving tool 88) is set as a sideway direction relative to an upright direction (the sideway direction does not mean a side direction relative to a front direction) in a state in which the electric retracting unit 16 is in the extended position. Consequently, the connector 89 can be inserted to the connector receiving tool 88 and connected to the connector connection terminal 91 without interfering with the motor connection terminals 86 located above the connector receiving tool 88. Also, the connector inlet 88a of the connector receiving tool 88 opens sideways, enabling suppression of entry of water to the connector receiving tool 88. Also, the connector inlet 88a of the connector receiving tool 88 opens toward the back of the mirror rotating section 15 (toward the front side of the vehicle in a state in which the mirror rotating section 15 is in the extended position in FIGS. 1 and 8) through the connector insertion port 94 of the seal cap 90. Therefore, in a state in which the housing cover 17 (FIG. 8) is removed from the visor 14 (state in FIGS. 1 and 9), the connector 89 of the wiring for the electric retracting unit 16 in the wire harness can be inserted to the connector insertion port 94 of the seal cap 90 from the back side of the mirror rotating section 15 and inserted to the connector receiving tool 88 through the connector inlet 88a. Also, after connection of the connector 89 at the distal end of the wiring for the electric retracting unit 16 in the wire harness to the connector receiving tool 88, an operation to pull the entire wire harness out upward from the hollow 31 of the shaft axle 24b may be performed. This operation is an operation for adjusting (increasing) a length of a part of the wire harness, the part being drawn out from the hollow 31 of the shaft axle 24b, when connecting connectors at distal ends of other wirings (for example, the wiring for the mirror adjustment actuator and the wiring for the turn lamp) included in the wire harness to respective corresponding connector receiving tools (sockets). At this time, if the connector receiving tool 88 that connects the connector 89 of the wiring of the electric retracting unit 16 opens upward like a connector receiving portion of an electric retracting unit described in Patent Literature 1, the connector 89 easily comes off from the connector receiving tool 88 along with the operation to pull the entire wire harness out upward, causing an inconvenience of needing to perform an operation to connect the connector 89 to the connector receiving tool 88 again. On the other hand, according to this embodiment, the connector inlet 88a of the connector receiving tool 88 opens sideways, and thus, even if an operation to pull the entire wire harness out upward is performed after connecting the connector 89 to the connector receiving tool 88, the connector 89 does not easily come off from the connector receiving tool 88, and thus such inconvenience is less likely to occur.

A configuration around the connector insertion port 94 formed in the seal cap 90 will be described with reference to FIG. 3. In the one side surface (vertical surface) of the seal cap 90, the connector insertion port 94 is formed at a position facing the connector inlet 88a (e.g., FIG. 1) of the connector receiving tool 88. Since the connector insertion port 94 is disposed in the vertical surface, entry of water to the inside of the electric retracting unit 16 from the connector insertion port 94 can be suppressed compared to a case where the connector insertion port 94 is disposed at an upper surface (horizontal surface) of the seal cap 90. The seal cap 90 includes an overhang 95 in a part of a circumference of the connector insertion port 94, the part being positioned on the upper side of the connector insertion port 94, the overhang 95 being disposed so as to extend in a circumferential direction of the connector insertion port 94. The overhang 95 is disposed in the circumferential direction of the connector insertion port 94. The overhang 95 is inclined along the one side surface of the seal cap 90. Also, the seal cap 90 includes a flat guide surface 97 at a position facing an open end of the connector insertion port 94, the flat guide surface 97 extending from a distal end of the overhang 95 to the outside of the open end. The overhang 95 and the guide surface 97 are joined to each other in such a manner that a surface of the overhang 95 and a surface of the guide surface 97 are disposed orthogonal to each other. Accordingly, the overhang 95 and the guide surface 97 can more suppress entry of water to the inside of the electric retracting unit 16 from the connector insertion port 94. In other words, water dropping to the overhang 95 flows down along the inclination of the overhang 95 and is let out from an outlet 95a at an end of the overhang 95. The outlet 95a does not face the connector insertion port 94, and thus, water let out from the outlet 95a can be prevented from entering the connector insertion port 94. Also, since the guide surface 97 is provided around an entrance of the connector insertion port 94, when the connector 89 (FIG. 9) at the distal end of the wire harness is inserted to the connector insertion port 94, the insertion work can be facilitated. Since the overhang 95 and the guide surface 97 are joined to each other in such a manner that the respective surfaces thereof are orthogonal to each other, stiffness of the seal cap 90, in particular, stiffness of a part around the connector insertion port 94 of the seal cap 90, can be enhanced. Therefore, during the work for connection of the connector 89, when a worker holds the connector 89 between the fingers and inserts and firmly presses the connector 89 into the connector insertion port 94, a pressing force of the fingers can be received and supported by the guide surface 97.

Although in the above-described embodiment, the direction of connection of the connector connection terminal 91 to the connector 89 is set as the sideway direction relative to the upright direction, the direction of connection can be set as an obliquely sideway direction relative to the upright direction. Also, although in the above-described embodiment, the circuit board 84 has only the part disposed vertically, a circuit board may include a part other than the part disposed vertically. In other words, a circuit board may include, for example, a part disposed horizontally, the part being flexed at right angle from an upper end of the part disposed vertically, in addition to the part disposed vertically. Also, although the above embodiment has been described in terms of the case where this invention is applied to an electric retractable rear view mirror for a vehicle, this invention is not limited to this case. In other words, this invention is applicable to any of an electric retractable rear view camera for a vehicle, the rear view camera being mounted on a door of a vehicle so as to protrude to the lateral side of the vehicle, other electric retractable rear-view devices for a vehicle and electric retractable view devices for a vehicle for purposes other than a rear view purpose, instead of applying this invention to a door mirror. An electric retractable rear view camera for a vehicle can be formed as, for example, one obtained by forming the visor 14 in FIG. 2 so as to have a small size and, instead of the mirror plate, mounting a camera in the visor 14 in such a manner that an optical axis of the camera faces the rear side of the vehicle when the visor 14 is in a use position.

The invention claimed is:

1. An electric retractable view device for a vehicle, the view device comprising:
    a shaft provided upright on a vehicle body side;
    a rotating body supported by the shaft so as to be rotatable in a direction around an axis of the shaft;
    a motor mounted with a motor shaft facing downward, at a position lateral to the shaft in the rotating body;
    a power transmission mechanism that transmits a driving force of the motor to the shaft to rotate the rotating body in the direction around the axis of the shaft; and
    a circuit board including a circuit that supplies electric drive power to the motor, the circuit board being mounted in the rotating body, wherein
    the circuit board is disposed vertically between the shaft and the motor in such a manner that front and back surfaces of the circuit board face the shaft and the motor, respectively, with reference to a posture of the view device as mounted in a vehicle,
    the circuit board includes a motor connection terminal to be connected to a motor terminal of the motor and a connector connection terminal to which a power supply connector of an external electric power supply wiring is to be connected,
    a space provided below the motor connection terminal and defined between the circuit board and the motor, and,
    in a state in which the motor connection terminal is connected to the motor terminal, the connector connection terminal is disposed within the space,
    wherein the power supply connector is configured to be inserted into the space and connected to the connector connection terminal,
    wherein the connector connection terminal is oriented such that a direction of connection of the connector connection terminal to the power supply connector is oriented generally parallel to a plane in which the circuit board is oriented, and
    wherein the power supply connector is configured so as to be capable of being connected to and detached from the connector connection terminal after the motor connection terminal of the circuit board is connected to the motor terminal.

2. The electric retractable view device for a vehicle according to claim 1, wherein the direction of connection of the connector connection terminal to the power supply connector is a sideway direction or an obliquely sideway direction relative to an upright direction with reference to the posture of the view device as mounted in the vehicle.

3. The electric retractable view device for a vehicle according to claim 2, wherein:
    the circuit board includes a connector receiving portion;
    the connector connection terminal is disposed inside the connector receiving portion; and
    the power supply connector is inserted to the connector receiving portion and thereby connected to the connector connection terminal.

4. The electric retractable view device for a vehicle according to claim 1, wherein the direction of connection of the connector connection terminal to the power supply connector is set as a direction toward a front side of the vehicle in a state in which a view device rotating section of the view device is in an extended position.

5. The electric retractable view device for a vehicle according to claim 1, wherein:
    the motor terminal includes a female terminal disposed in a side surface of the motor, the female terminal being disposed in a direction in which the female terminal faces the shaft; and
    the motor connection terminal includes a male terminal to be inserted to the female terminal.

6. The electric retractable view device for a vehicle according to claim 1, wherein:
    the rotating body includes a casing; and
    the casing includes a connector insertion port through which the power supply connector is inserted from an outside of the casing and connected to the connector connection terminal, at a position in a vertical surface of the casing, the position facing the connector connection terminal.

7. The electric retractable view device for a vehicle according to claim 6, wherein the casing includes an overhang in at least a part of a circumference of the connector insertion port, the part being positioned on an upper side of the connector insertion port.

8. The electric retractable view device for a vehicle according to claim 7, wherein the casing includes a guide surface extending from a distal end of the overhang facing an open end of the connector insertion port to an outside of the open end.

9. The electric retractable view device for a vehicle according to claim 8, wherein the overhang and the guide surface are joined to each other in such a manner that a surface of the overhang and a surface of the guide surface are disposed orthogonal to each other.

10. The electric retractable view device for a vehicle according to claim 1, wherein:
    the power transmission mechanism includes a shaft outside-fitting gear fitted on an outer circumference of the shaft; and
    the shaft outside-fitting gear is formed of a material including a resin as a base material.

11. The electric retractable view device for a vehicle according to claim 1, wherein a longitudinal axis of the connector connection terminal is oriented in the direction of connection of the connector connection terminal to which the power supply connector is to be connected.

12. The electric retractable view device for a vehicle according to claim 1, wherein:
    one of the power supply connector and the connector connection terminal is a female connector and the other of the power supply connector and the connector connection terminal is a male connector.

* * * * *